(12) United States Patent
Kanemitsu

(10) Patent No.: US 6,862,086 B2
(45) Date of Patent: Mar. 1, 2005

(54) ANGLE DETECTING APPARATUS AND PROJECTOR HAVING THE SAME

(75) Inventor: Shiroshi Kanemitsu, Chiba-ken (JP)

(73) Assignee: Seiko Precision Inc., Narashino (JP)

( * ) Notice: Subject to any disclaimer, the term of this patent is extended or adjusted under 35 U.S.C. 154(b) by 0 days.

(21) Appl. No.: 10/651,525

(22) Filed: Aug. 29, 2003

(65) Prior Publication Data

US 2004/0125364 A1 Jul. 1, 2004

(30) Foreign Application Priority Data

Aug. 30, 2002 (JP) .......................................... 2002-253402

(51) Int. Cl.[7] .......................... G01B 11/26; G01C 1/00
(52) U.S. Cl. .............................. 356/139.1; 356/141.1; 356/141.2; 356/141.3; 356/152.3
(58) Field of Search ................ 356/139.1, 141.1–141.3, 356/152.3, 620, 622; 438/7, 16, 29–32

(56) References Cited

U.S. PATENT DOCUMENTS

| | | | | |
|---|---|---|---|---|
| 4,973,156 A | * | 11/1990 | Dainis ...................... | 356/141.5 |
| 5,090,803 A | * | 2/1992 | Ames et al. ............ | 356/139.03 |
| 5,648,846 A | * | 7/1997 | Douine et al. .......... | 356/139.09 |
| 2002/0021418 A1 | | 2/2002 | Raskar ........................ | 353/69 |

FOREIGN PATENT DOCUMENTS

| | | |
|---|---|---|
| EP | 0974811 | 1/2000 |
| JP | 9033248 | 2/1997 |
| JP | 00089098 | 3/2000 |
| JP | 00180159 | 6/2000 |

* cited by examiner

Primary Examiner—Bernarr E. Gregory
Assistant Examiner—Brian Andrea
(74) Attorney, Agent, or Firm—Adams & Wilks

(57) ABSTRACT

In an angle detecting apparatus and projector using range finder units, range finding calculations are performed in plural directions using line type passive range finders as the range finding units. An average value of inclination angles calculated based on the range finding calculations is selected as the inclination angle. Thus, if one range finding result has an abnormal value, the adverse effects thereof are reduced and the structure is miniaturized.

14 Claims, 8 Drawing Sheets

ANGLE DETECTING APPARATUS AND PROJECTOR HAVING THE SAME

BACKGROUND OF THE INVENTION

1. Field of the Invention

The present invention relates to an angle detecting apparatus using one or more range finders, and to a projector having the same.

2. Description of Related Art

In a conventional projector, such as a liquid-crystal or DLP projector, there is a type of distortion known as a keystone distortion which appears as a distorted shape of an image caused by an improper positional relationship between the projector and the viewing screen. In keystone distortion, one side of the projected image is typically larger than the opposite side. There are generally two methods of optical correction used for correcting keystone distortion, including an electric correction method in which an image generated by a video circuit is projected with a keystone distortion inverse to the projected image, and an optical correction method in which the tilt of a condensing lens contained within a projection optical system of the projector is corrected without correcting the image created by the video circuit.

A known technique that uses a range finder to automatically correct such a keystone distortion is described in, for example, JP-A-2000-122617. The technique described therein comprises the steps of detecting the distance to the screen using two active range finding sensors mounted at different locations in front of a liquid crystal projector, calculating one inclination angle of the liquid crystal projector with respect to the screen based on the two detected distances and on the distance between the two range finding sensors, and correcting the keystone distortion based on the calculated inclination angle by the aforementioned method.

In the technique described in JP-A-2000-122617, only one inclination angle of the liquid crystal projector with respect to the screen is detected from only two range finding results. Therefore, there is the problem that if one or both of the two range finding results are not reliable due to noise or the like during range finding calculation, then the accuracy at which the inclination angle is detected deteriorates.

SUMMARY OF THE INVENTION

It is an object of the present invention to provide an angle detecting apparatus using one or more range finders and a projector equipped therewith, wherein if one range finding operation is not performed normally, the adverse effect thereof can be reduced.

In accordance with a first aspect of the present invention, an angle detecting apparatus is provided for detecting an angular position of a target. The angle detecting apparatus comprises a range finding portion for finding the distance to a target in each of three or more mutually different plural range finding directions, and an inclination angle calculating portion for calculating two or more inclination angles of the target with respect to a reference line based on three or more range finding results of the range finding portion and finding one inclination angle based on the two or more calculated inclination angles. According to this configuration, if the range finding operation is not performed normally in at least one direction, the adverse effects can be reduced.

In accordance with a second aspect of the invention, the inclination angle calculating portion calculates the average value of the two or more inclination angles as the one inclination angle. According to this configuration, if the range finding operation is not performed normally in at least one direction, the adverse effects thereof can be reduced.

In accordance with a third aspect of the invention, the plural directions are four or more mutually different directions, and the inclination angle calculating portion calculates three or more inclination angles of the target with respect to the reference line based on four or more range finding results of the range finding portion and calculates one inclination angle based on the inclination angles remaining after removing maximum and minimum angles from the three or more calculated inclination angles. According to this configuration, one inclination angle is found based on the inclination angles remaining after removing the maximum and minimum angles which are likely to be calculated based on erroneous range finding. Consequently, deterioration of the accuracy at which the angle is detected can be prevented.

In accordance with a fourth aspect of the invention, in the angle detecting apparatus of the third aspect, the inclination angle calculating portion calculates the one inclination angle as the average value of the inclination angles remaining after removing the maximum and minimum angles of the three or more calculated inclination angles. According to this configuration, the same advantages can be obtained as in the foregoing aspects. In addition, deterioration of the accuracy at which the angle is detected can be prevented.

In accordance with a fifth aspect of the invention, the inclination angle calculating portion calculates the inclination angle of the target with respect to the reference line based on range finding results of the range finding portion for those of the plural directions that are on one side of a front direction, calculates the inclination angle of the target with respect to the reference line based on range finding results of the range finding portion about the other directions, and calculates the one inclination angle based on the two calculated inclination angles. According to this configuration, for each of two separate regions on the opposite sides of the front direction, the inclination angle of the target to be measured is calculated, and one inclination is found based on the two calculated inclination angles. Therefore, the overall inclination angle of the target to be measured can be found.

In accordance with a sixth aspect of the invention, the range finding portion of any one of the first through fifth aspects described above comprises a line type passive range finder having a pair of lenses spaced from each other by a baseline length, line sensors on which a pair of images of the target to be measured are focused by the pair of lenses, and a calculating portion for calculating the distance based on outputs from the line sensors in each of plural mutually different directions, and that the reference line is in the direction of said baseline length. According to this configuration, the above-described advantages can be obtained, and the distance to the target can be determined in each of three or more mutually different plural range finding directions using one line type passive range finder. Since the number of range finders does not need to be increased along with an increase in the range finding directions as in the prior art, the angle detecting apparatus can be simplified in structure.

In accordance with a seventh aspect of the invention, an angle detecting apparatus is provided for detecting the angular position of a target. The angle detecting apparatus comprises a line type passive range finder having a pair of lenses spaced from each other by a baseline length, line sensors on which a pair of images of a target to be measured are focused by the pair of lenses, and a calculating portion for performing range-finding calculations based on outputs of the line sensors in each of three or more mutually different plural directions, and an inclination angle calculating portion for calculating two or more inclination angles of the target based on three or more plural range finding results of the line type passive range finder with respect to the baseline direction. According to this configuration, the distance to the target to be measured can be found in each of three or more mutually different range finding directions, using the single line type passive range finder. Hence, the angle detecting apparatus can be simplified in structure. The known structure described above has the problem that the number of range finders is increased with an increase in the number of range finding directions, thus increasing the size of the structure. This problem is avoided in accordance with the seventh aspect of the invention.

In accordance with an eighth aspect of the invention, the above-described target is a screen or wall on which an image or images are projected. According to this structure, the inclination angle of the screen or wall can be detected.

A projector for projecting an image created based on an input image signal onto a screen according to a ninth aspect of the invention comprises the inclination angle detecting apparatus described above, and an image distortion correcting portion for correcting distortion in the image on the screen based on an inclination angle calculated by said inclination angle detecting apparatus. According to this structure, distortion in the image corresponding to the relative inclination angle between the projector and screen can be realized with a simple structure.

DETAILED DESCRIPTION OF THE PREFERRED EMBODIMENT

Figure 1:
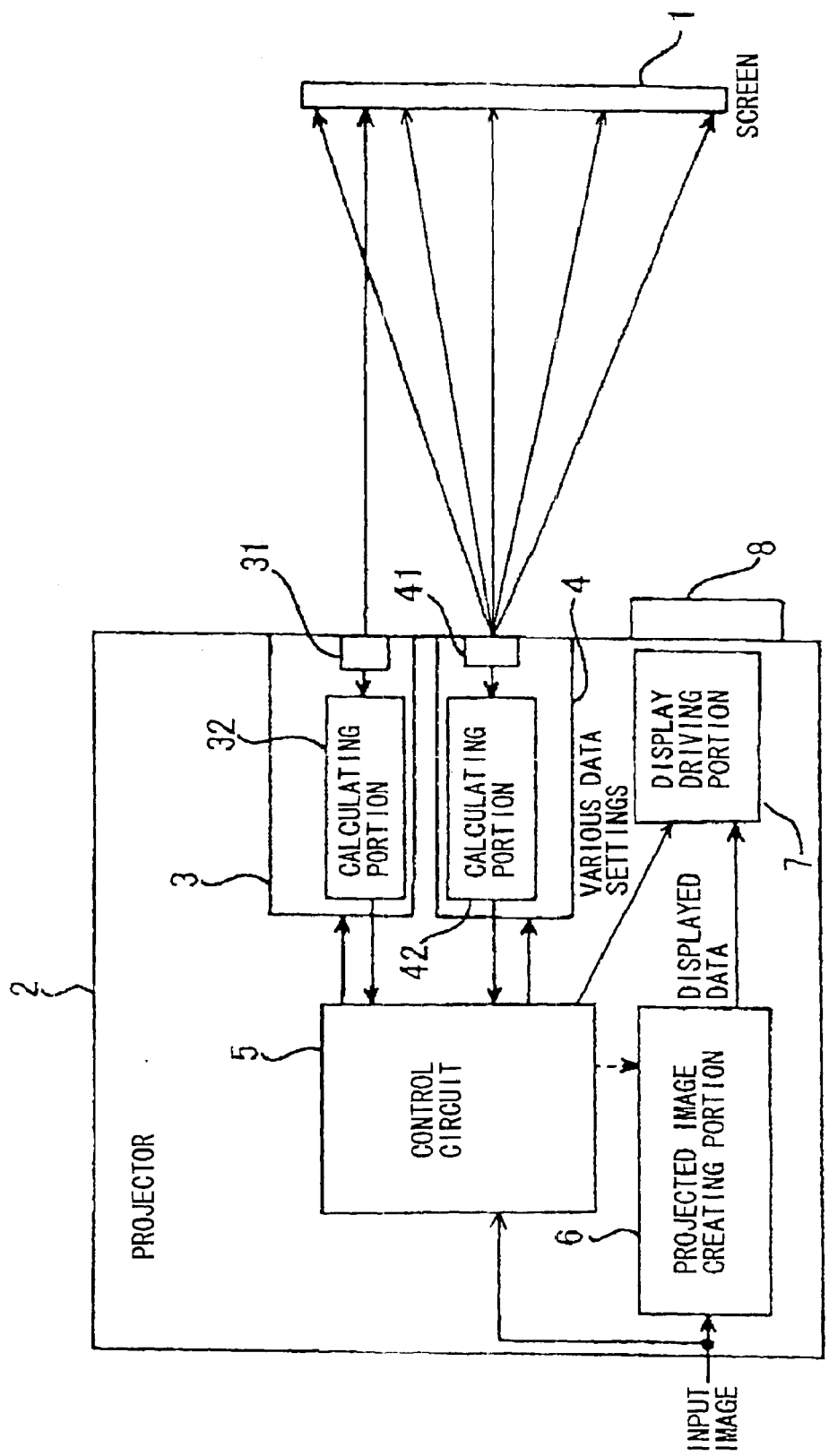
FIG. 1 is a block diagram showing one embodiment of the present invention.
Figure 2:
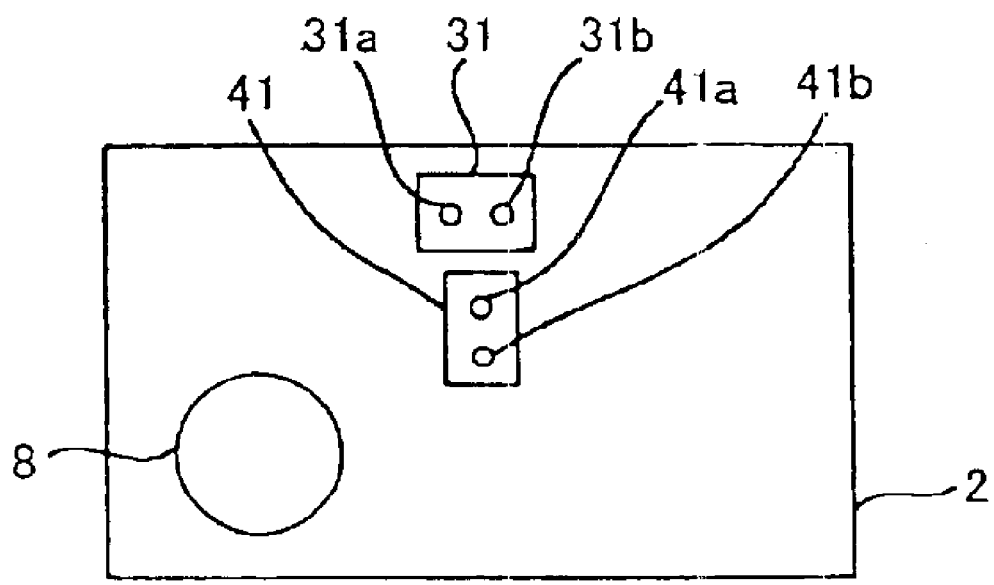
FIG. 2 is a front elevation of the structure shown in FIG. 1.

A preferred mode of practice of the present invention is hereinafter described based on an embodiment of a projector 2 shown in the attached drawings. FIG. 1 is a diagram showing an example of the projector 2 having an angle detecting apparatus therein for detecting the inclination angle between a screen or wall 1 and means provided in the projector 2 for correcting keystone distortion in the image projected onto the screen 1 based on the detected inclination angles. FIG. 2 is a front elevation of the projector 2. It will be appreciated that the inclination angle detecting apparatus is not limited to use in a projector. Furthermore, the apparatus is not restricted to one that detects the inclination angle with respect to the screen.

In FIG. 1, a first line type passive range finder 3 has an image pickup portion 31 and a calculating portion 32. The image pickup portion 31 is fitted with a pair of lenses 31a and 31b shown in FIG. 2 and a pair of line sensors 31c and 31d (described later) acting as first line sensors. A pair of images of the screen 1 serving as the target to be measured are focused onto the line sensors 31c and 31d by the lenses 31a and 31b. The calculating portion 32 performs calculations for range finding in each of plural mutually different directions based on the outputs from the pair of line sensors 31c and 31d. The range finder detects the distance to the screen 1 at plural points in the horizontal (right and left) direction. The pair of lenses 31a and 31b are spaced from each other horizontally by a first baseline length b. In the present embodiment, the plural mutually different directions comprises five directions. The number of directions is not limited to five and may be any value of three or more directions.

A second line type passive range finder 4 has an image pickup portion 41 and a calculating portion 42. The image pickup portion 41 is fitted with a pair of lenses 41a and 41b shown in FIG. 2 and with a pair of line sensors 41c and 41d (described later) acting as second line sensors. A pair of images of the screen 1 are focused onto the line sensors 41c and 41d by the lenses 41a and 41b by the lenses 41a and 41b. The calculating portion 42 performs calculations for range finding in each of plural mutually different directions based on the outputs of the pair of line sensors 41c and 41d. The range finder detects the distance to the screen 1 at plural points in the vertical (up and down) direction. The pair of lenses 41a and 41b are arranged at a distance of a second baseline length b' in the vertical direction. In the present embodiment, the mutually different plural directions comprise five directions. The number of directions is not limited to five and may be any value of three or more directions.

A control circuit 5, such as a microprocessor, acting as first and second inclination angle calculating portions provides various controls and performs various calculations. The control circuit calculates plural relative inclination angles between the screen 1 and the projector 2 (in the direction of the first baseline length) in the horizontal direction, based on the results of the range finding calculations of the line type passive range finder 3. The control circuit also calculates a plurality of inclination angles between the screen 1 and the projector 2 (in the direction of the second baseline length) in the vertical direction, based on the results of the range finding calculations of the line type passive range finder 4. Furthermore, the control circuit 5 finds one inclination angle in the horizontal direction based on plural calculated horizontal inclination angles or one inclination angle in the vertical direction based on plural calculated inclination angles in the vertical direction.

A projected image creating portion 6 enters image data delivered from an image data output portion of an external personal computer or the like, converts the input image data into display data, and delivers the display data to a display driving portion 7.

The display driving portion 7, acting as an image distortion correcting portion, adjusts a projection optical system 8 including a condensing lens based on horizontal and vertical inclination angles calculated by the control circuit to thereby correct keystone distortion in the projected image.

Figure 3:
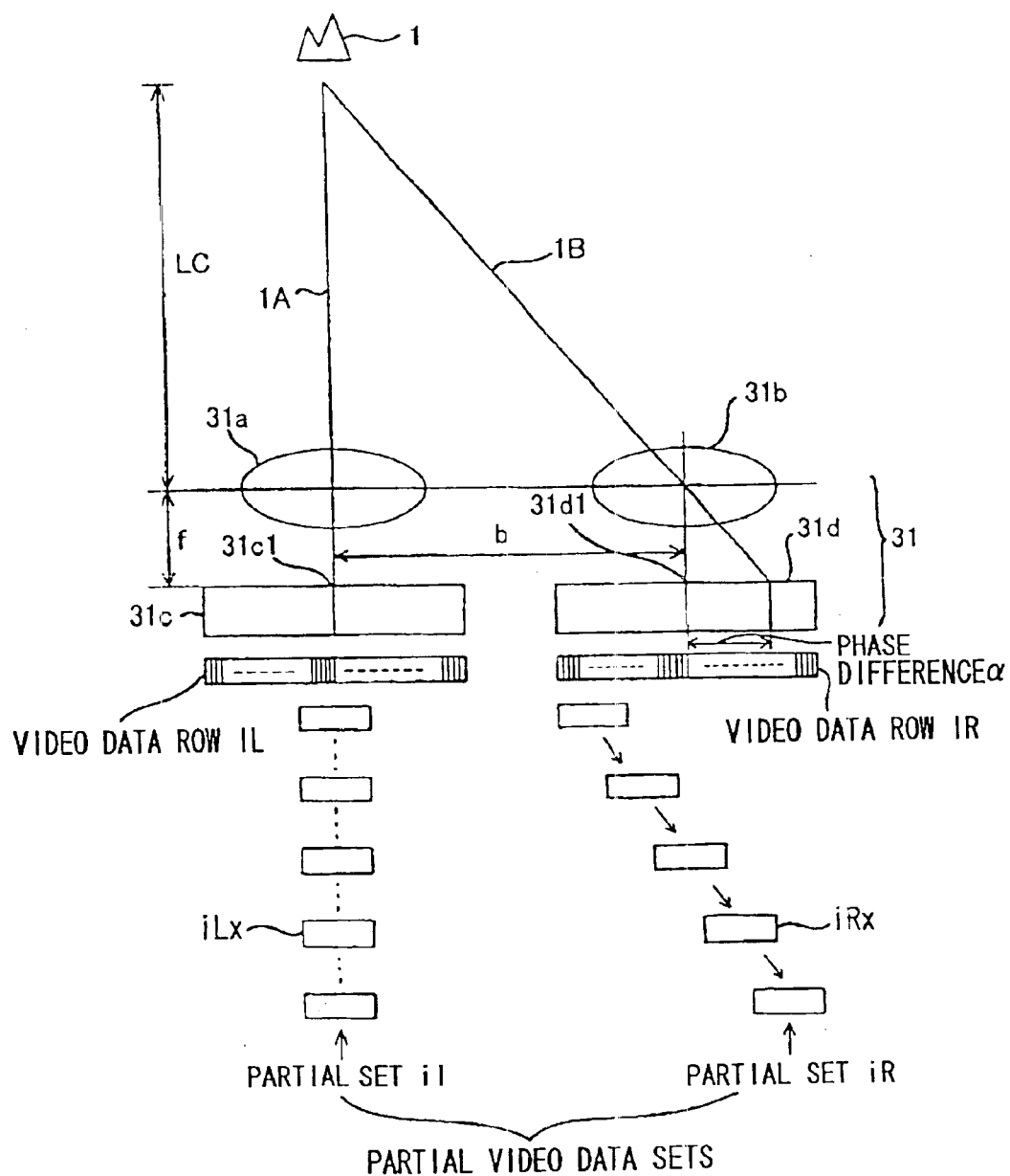
FIG. 3 is a diagram illustrating the range finding principle of the line type passive range finder of FIG. 1.

The principle of operation of the line type passive range finders (external light triangulation range finding system) 3 and 4 is next described by referring to FIG. 3. The line type passive range finder 3 and the line type passive range finder 4 are installed at different angles but identical in structure. To simplify the description, only the line type passive range finder 3 is described. The correspondences and relations between the structures are described. The pair of lenses 41$a$ and 41$b$ of the line type passive range finder 4 correspond to the pair of lenses 31$a$ and 31$b$ of the line type passive range finder 3. The pair of line sensors 41$c$ and 41$d$ of the line type passive range finder 4 correspond to the pair of line sensors 31$c$ and 31$d$ of the line type passive range finder 3. The image pickup portion 41 of the line type passive range finder 4 corresponds to the image pickup portion 31 of the line type passive range finder 3. The calculating portion 42 of the line type passive range finder 4 corresponds to the calculating portion 32 of the line type passive range finder 3.

In this figure, the pair of lenses 31$a$ and 31$b$ are disposed at a distance of a given baseline length b and act to focus images of the target (screen) 1 to be measured onto the pair of optical sensor arrays 31$c$ and 31$d$, respectively, via mutually different optical paths 1A and 1B. The sensor arrays 31$c$ and 31$d$ are spaced from the lenses 31$a$ and 31$b$, respectively, by focal distance f. It is assumed that the target 1 to be measured is present at a distance of LC from the pair of lenses 31$a$ and 31$b$ in the front direction.

When the target 1 to be measured exists at an infinite distance, the centers of the images focused onto the pair of optical sensor arrays 31$c$ and 31$d$ are at reference positions 31$c$1 and 31$d$1 on the optical sensor arrays 31$c$ and 31$d$ which correspond to the optical axes of the lenses 31$a$ and 31$b$. When the measured target 1 is closer than an infinite distance, the images are focused at positions shifted by a from the reference positions 31$c$1 and 31$d$1. Based on the principle of triangulation, the distance LC to the measured target 1 is LC=b f/$\alpha$. Here, the baseline length b and focal distance f are constants. Therefore, the distance LC can be measured if the amount of deviation $\alpha$ is detected. This is the principle of operation of the passive range finder of external light triangulation. This calculation is performed by the calculating portion 32.

The amount of deviation a from the reference positions are detected by correlation computations performed by the calculating portion 32 shown in FIG. 1 for partial video data sets IL and IR extracted from a pair of video signals (video data rows) IL and IR, respectively, delivered from the pair of line sensors 31$c$ and 31$d$. Since the correlation computations are well known, a detailed description thereof is omitted. Briefly speaking, in such a computation, the region that shows the highest degree of coincidence when the partial video data sets iL and iR are superimposed as shown in FIG. 3 is detected when the superimposed partial video data sets iL and iR are shifted in steps in the direction of array of the light sensors.

When the correlation computation is performed, the direction of the optical axis of the lens 31$a$ can be taken as the range finding direction by fixing one partial video data set iL as a standard portion according to the reference position as shown in FIG. 3 and shifting the other partial video data set iR in steps as a reference portion. However, where the range finding direction is taken as a direction directed from the center positions of both lenses, one partial video data set iL and the other partial video data set iR may be shifted with respect to each other.

Figure 4:
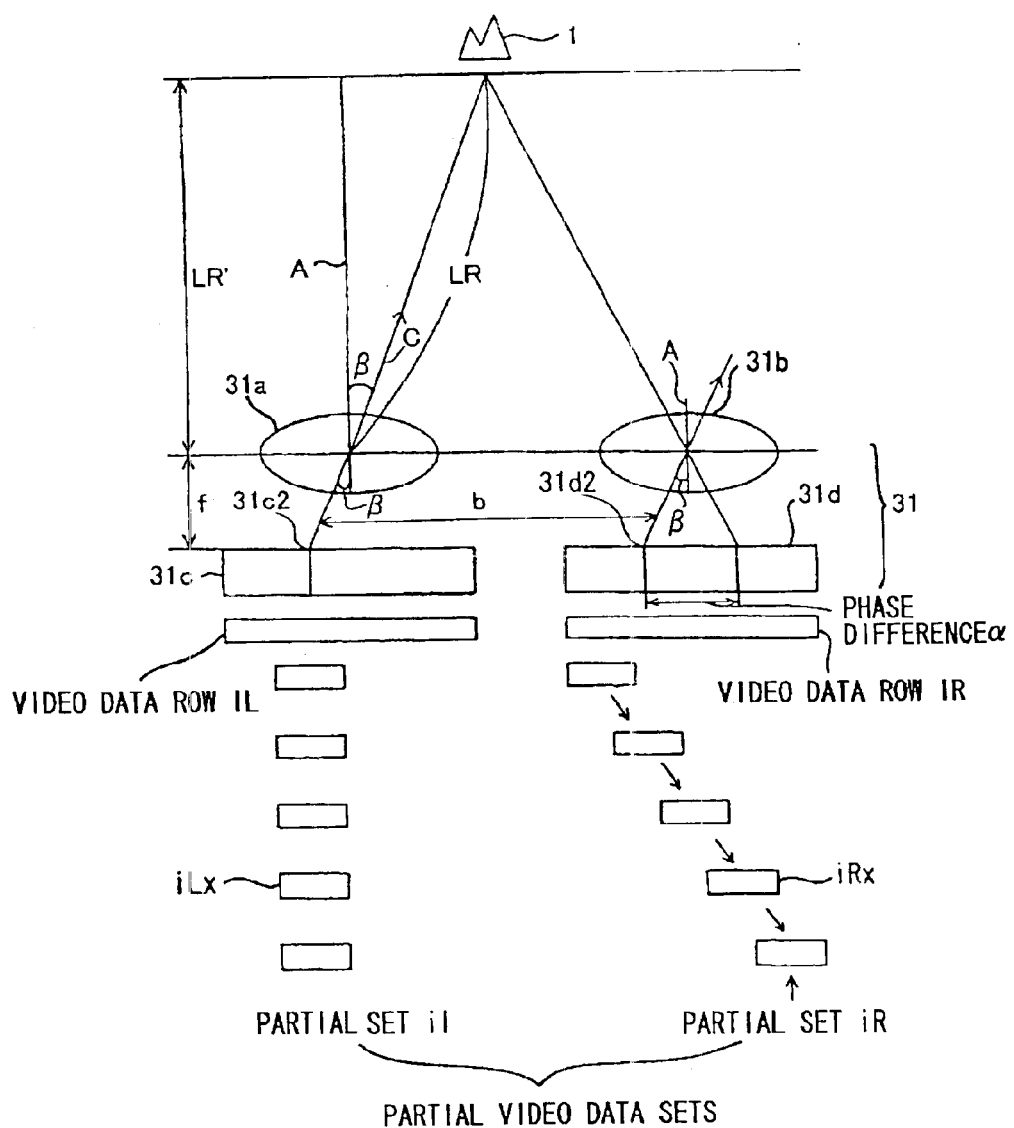
FIG. 4 is a diagram illustrating the range finding principle of the line type passive range finder of FIG. 1.

The principle of range finding of the line type passive range finder is next described by referring to FIG. 4 where a direction different from the front is taken as the range finding direction.

In this figure, when the measured target 1 exists at an infinite distance in the direction C along which one wants to measure, it is assumed that the centers of images focused onto the pair of optical sensor arrays 31$c$ and 31$d$ are at reference positions 31$c$2 and 31$d$2. If the measured target 1 is closer than an infinite distance in the range finding direction C, the images of the measured target 1 are focused at positions shifted from the reference positions 31$c$2 and 31$d$2 by $\alpha$. Based on the principle of triangulation, the distance LR to the measured target 1 is given by LR=bf/($\alpha$ cos $\beta$). The angle $\beta$ is the inclination angle of the range finding direction with respect to the normal A to the baseline. This is an angle set by determining the range finding direction C. Here, the baseline length b, focal distance f, and cos$\beta$ are constants. Therefore, the distance LR can be measured by detecting the amount of deviation $\alpha$. This is the principle of range finding where a direction different from the front is taken as the range finding direction.

Furthermore, the distance LR' from a straight line that is an extension of the baseline length to the measured target 1 is given by LR'=LR cos $\beta$=b f/$\alpha$. In the same manner as the foregoing, the distance LR' can be measured by detecting the amount of deviation $\alpha$. When the distance LR' is found, the angle $\beta$ is made unnecessary.

Also in this case, when a correlation computation is performed, a direction C shifted by angle $\beta$ with respect to the optical axis of the lens 31$a$ can be taken as the range finding direction by fixing one partial video data set iL as a standard portion and shifting the other partial video data set iR as a reference portion as shown in FIG. 4. Consequently, distances in plural directions can be detected by a single line type passive range finder by setting plural standard positions according to the range finding directions.

Figure 5:
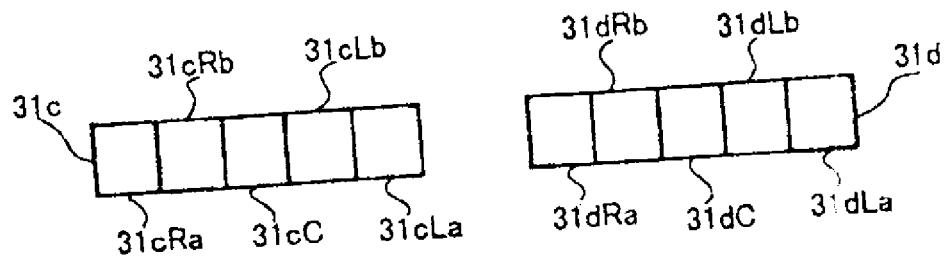
FIG. 5 is a diagram showing plural range finding calculating regions of a pair of line sensors 31c and 31d of one embodiment of the present invention.

In the present embodiment, the relative inclination angle between the screen 1 and the projector 2 is detected by utilizing such line type passive range finders 3 and 4.

Where range finding is done in plural directions with one line type passive range finder, the amount of deviation is found by setting a plurality of range finding calculational regions 31$c$Ra, 31$c$Rb, 31$c$C, 31$c$Lb, and 31$c$La in the line sensor 31$c$ as shown in FIG. 5 according to a plurality of standard positions based on the range finding directions (in the present embodiment, Ra (right), Rb (right to the center), C (center), Lb (left to the center), and La (left)), setting a plurality of range finding calculational regions 31$d$Ra, 31$d$Rb, 31$d$C, 31$d$Lb, and 31$d$La in the line sensor 31$d$ according to a plurality of standard positions based on the plural range finding directions Ra, Rb, C, Lb, and La, and using the partial video data in the pair of range finding calculational regions 31$c$Ra and 31$d$Ra, 31$c$Rb and 31$d$Rb, 31$c$C and 31$d$C, 31$c$Lb and 31$d$Lb, and 31$c$La and 31$d$La which correspond to each other in the range finding directions. In the present embodiment, the range finding directions are five, i.e., Ra (right), Rb (right to the center), C (center), Lb (left to the center), and La (left). The range finding directions are not limited to them but rather can be modified appropriately. Also, the range finding directions are not limited to five and may be any value of three or more directions.

Operation of the device is described below.

When the power supply is turned on, the control circuit 5 makes a decision as to whether image data has been entered. If image data has been entered, the control circuit causes the projected data creating portion 6 to deliver display data corresponding to the image data. An image is projected onto the screen 1 via the display driving portion 7 and projection optical system 8. If image data has not been entered, contrast image data which is used for adjustment and has been previously stored in the control circuit 5 is output to the projected data creating portion 6. An image corresponding to the data is projected onto the screen 1. This operation is intended to display an image with contrast on the screen 1 to prevent the range finding accuracy of the line type passive range finders 3 and 4 from deteriorating. In this manner, light projection to prevent the accuracy at which the line type passive range finders 3 and 4 perform range finding operations (detection of the inclination angle) from deteriorating is carried out by making use of image projection function intrinsically possessed by the projector. Consequently, there is no need for a dedicated light projector portion for angle detection and the structure can be simplified. Furthermore, the distance capable of being measured by range finding corresponds to the distance over which projection can be performed because range finding is done based on image projection. Accordingly, it is not necessary to match the range finding limit distance and projection limit distance to each other.

Subsequently, the control circuit 5 operates the line type passive range finders 3 and 4 to cause them to detect the distance to the screen 1 in plural directions.

The control circuit 5 calculates a plurality of relative inclination angles between the screen 1 and the projector 2 in the horizontal direction (in the direction of the first baseline) based on the results of range finding calculations of the line type passive range finder 3. Also, the control circuit calculates a plurality of relative inclination angles between the screen 1 and the projector 2 in the vertical direction (in the direction of the second baseline) based on the results of range finding calculations of the line type passive range finder 4.

FIGS. 6–10 are diagrams for illustrating one example of calculation of the aforementioned inclination angles. This example includes detection of the inclination angle in the horizontal (left and right) direction, detection of the inclination angle in the vertical (up and down) direction, or detection of the inclination angle in a composite horizontal/vertical direction. Since an understanding can be made with a similar system, detection of the inclination angle in the horizontal direction using the line type passive range finder 3 is hereinafter described.

Figure 6:
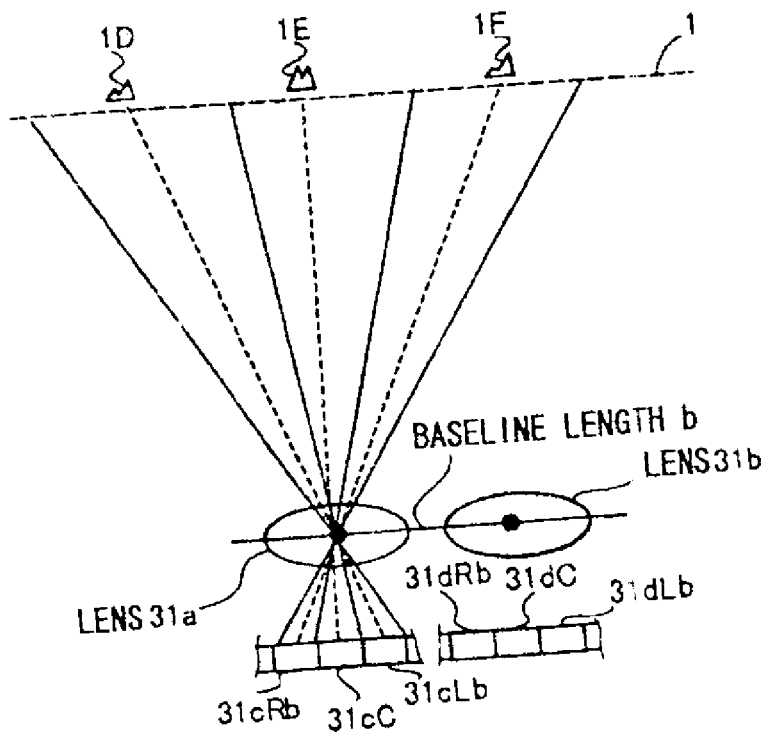
FIG. 6 is a diagram showing an inclination angle detection system of FIG. 1.

FIG. 6 is a diagram for illustrating pre-adjustment processing of the line type passive range finder 3 in the protector. Where a direction different from the front is taken as a range finding direction, the line type passive range finder 3 used in this embodiment delivers the distance (in the example of FIG. 4, LR' rather than LR) from a straight line that is an extension of the baseline length to the measured target 1 rather than the intrinsic distance as its result of range finding calculation. Therefore, where measured targets 1D, 1E, and 1F on a screen or wall 1 parallel to the direction of the baseline length b as shown in FIG. 6 are measured by range finding, the results of the calculated distances (phase differences) to the measured targets 1D, 1E, and 1F should be ideally identical. In practice, the same results are unlikely to be obtained by the effects of aberration in each range finding calculational region. Therefore, in the present embodiment, to bring these calculational results into agreement with each other, a corrective coefficient is previously calculated for each range finding calculational region. The corrective coefficient is stored in an EEPROM within the calculating portion. When a calculation is performed for range finding, the variations in the results of calculations of distances by range finding are corrected by making use of the corrective coefficient. Accordingly, where the target 1 on a straight line parallel to the direction of baseline b is measured by range finding, the same calculational results (i.e., the distance from a straight line that is an extension of the baseline length to the measured target 1) are obtained regardless of the range finding direction (range finding calculational region).

Figure 7:
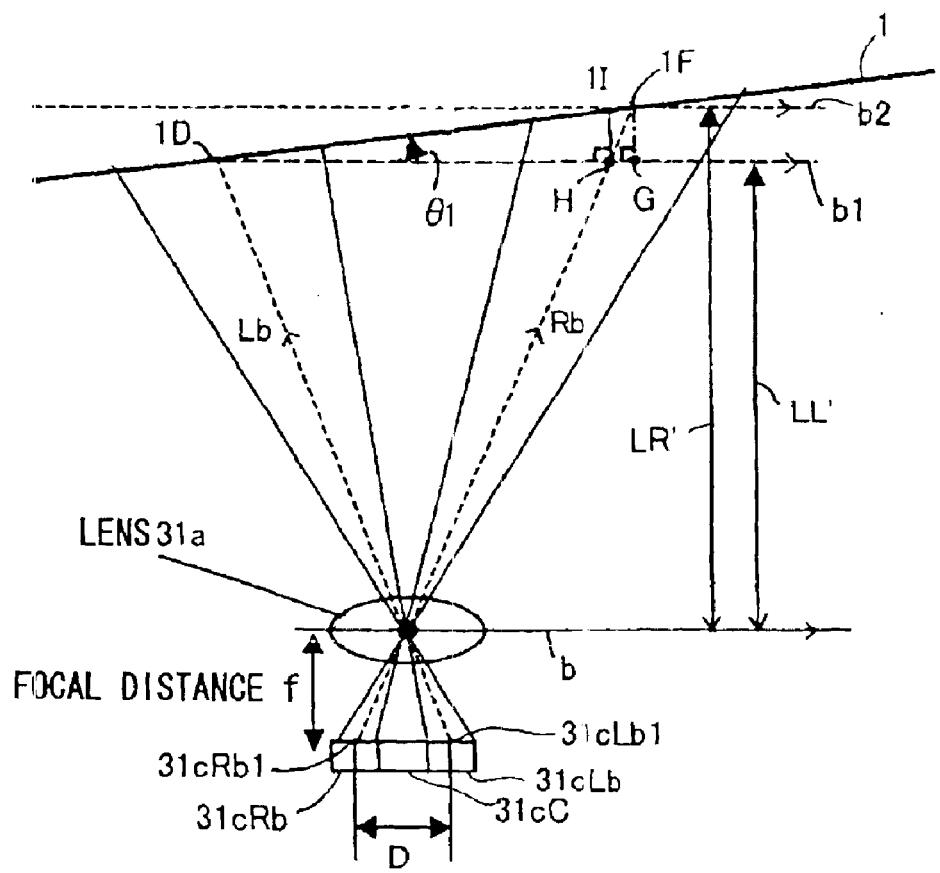
FIG. 7 is a diagram showing an inclination angle detection system of FIG. 1.

FIG. 7 shows an example of a case in which the distance to the screen 1 is measured using the line type passive range finder 3 that has been adjusted as mentioned previously. The screen 1 is tilted at angle (inclination angle) θ1 with respect to the direction of the baseline length b (horizontal direction of the projector 2). For easier description, an example is given in FIG. 7 in which range finding is done in two range finding directions, using range finding calculational regions 31cRb and 31cLb, and the inclination angle is found based on the results of the range finding. In this figure, the result of range finding calculation using the range finding calculational region 31cRb is LR'. The result of range finding calculation using the range finding calculational region 31cLb is LL'. Let b1 be a straight line which passes through the range finding point 1D on the screen 1 and is parallel to the baseline length b. Let b2 be a straight line that passes through the range finding point 1F on the screen 1 and is parallel to the baseline length b. Let G be the intersection of a normal to the straight line b1 passing through the range finding point 1F and the straight line b1. Let H be the intersection of the range finding direction Rb and the straight line b1. Let 1I be the intersection of a normal to the straight line b1 passing through the point H and the screen 1. Let D be the distance between the range finding calculational regions 31cRb and 31cLb. In the present embodiment; let 31cRb1 be the intersection of the range finding direction Rb and the range finding calculational region 31cRb. Let 31cLb1 be the intersection of the range finding direction Lb and the range finding calculational region 31cLb. Let D be the distance between the point 31cRb1 and the point 31cLb1.

Figure 8:
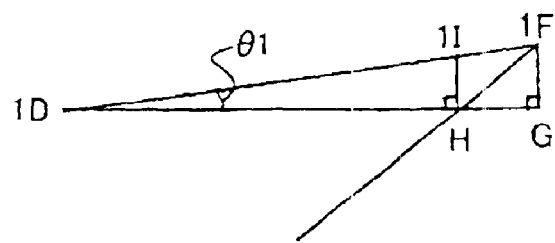
FIG. 8 is a diagram showing an inclination angle detection system of FIG. 1.

Under this circumstance, the distance between the range finding point 1F and the point G is LR'–LL'. That is, this is the difference between the distance LR' and the distance LL'.

Where the angle θ1 is small as shown in FIG. 8, the distance between the range finding point 1F and the point G is substantially equal to the distance between the point H and the point 1I. Noting this shows that the distance between the point H and the point 1I is almost equal to LR'–LL'. In the present example, the angle θ1 is the inclination angle between the projector 2 and the screen 1. Since an image projected by the projector 2 is projected on the screen 1, it is not considered that the angle θ1 increases greatly. If the distance between the point H and the point 1I is regarded to be LR'–LL', no great problems will be produced in practical applications. For instance, where an image produced by the portable projector 2 is projected onto the screen 1, the user installs the projector and so it seems that the angle between both is usually adjusted roughly by the user's installation.

Figure 9:
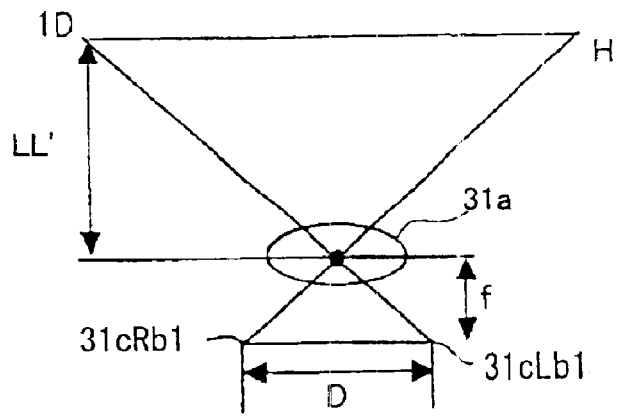
FIG. 9 is a diagram showing an inclination angle detection system of FIG. 1.

Furthermore, as shown in FIG. 9, a triangle formed by the range finding point 1D, the point H, and the center of the lens 31a is analogous to a triangle formed by the point 31cRb1, the point 31cLb1, and the center of the lens 31a. Therefore, the distance between the range finding point 1D and the point H is LL'D/f.

Figure 10:
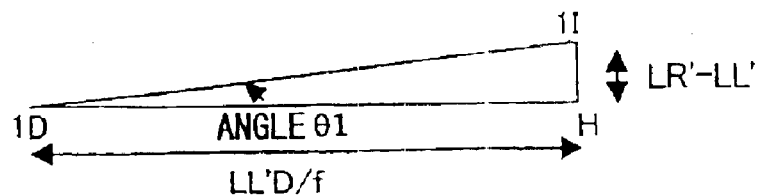
FIG. 10 is a diagram showing an inclination angle detection system of FIG. 1.

Consequently, as shown in FIG. 10, from a right triangle formed by the range finding point 1D, the point H, and the point 1I, the inclination angle θ1 can be found from $$\theta 1 = \arctan(((LR'-LL')/(LL'D/f))$$

In the above description, the distance between the point 31cRb1 and the point 31cLb1 is used as the distance D between the range finding calculational regions 31cRb and 31cLb. For example, it may be the distance between the center position of the range finding calculational region 31cRb in the direction of the baseline and the center position of the range finding calculational region 31cLb in the direction of the baseline. In this case, it is not necessary to detect the intersection with the range finding direction on the range finding calculational regions. A value corresponding to the distance between two range finding calculational regions used for angle detection can be detected easily. Thus, the angle detection can be simplified.

Where high accuracy is required for the angle detection, the distance between the contrast center of gravity positions in the two range finding calculational regions used for the angle detection may be used as a value corresponding to the distance between the two range finding calculational regions. An example of this case is described below by referring to FIG. 11.

As is well known, passive range finding includes an operation for detecting the state in which the degree of coincidence becomes highest when a pair of images are superimposed. This degree of coincidence is used to detect whether the contrast states of the pair of images are coincident.

Figure 11:
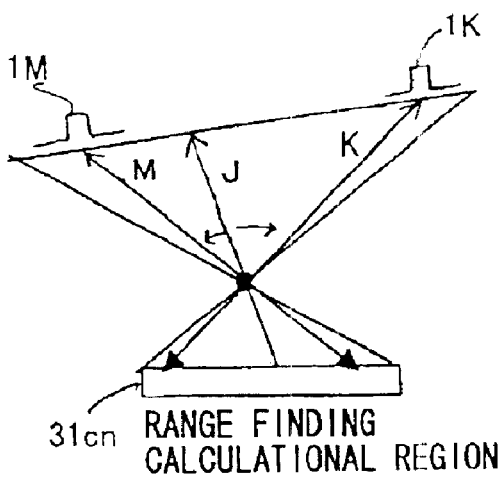
FIG. 11 is a diagram showing an inclination angle detection system of FIG. 1.

Accordingly, in the case of passive range finding, even where a designed range finding direction in one range finding calculational region 31cn is in the direction of arrow J as shown in FIG. 11, if an image of the measured target 1 focused on the range finding calculational region 31cn has a contrast position 1K only in the direction of arrow K, the actual range finding direction deviates from the direction of the arrow J toward the direction of the arrow K. Where an image of the target 1 undergoing a range finding measurement is focused onto the range finding calculational region 31cn, if the contrast position 1M of this image is present only in the direction of arrow M, the actual range finding direction deviates from the direction of arrow J toward the direction of arrow M. Where an image of the target 1 undergoing a range finding measurement is focused onto the range finding calculational region 31cn, if this image has contrast positions 1K and 1M in the directions of the arrows K and M, the actual range finding direction deviates from the direction of the arrow J to the contrast center of gravity position of the image focused onto the range finding calculational region 31cn.

Therefore, if the distance between the contrast center of gravity positions in the range finding calculational regions is used as a value corresponding to the distance between the two range finding calculational regions used for angle detection, accurate distance D can be used. The accuracy at which the angle is detected is improved. A method of finding a contrast center of gravity is well known by JP-A-8-75985. For reference, this is found from the following Mathematical Formula 1 in the present embodiment.

$$J = \frac{\sum_{i=Sa}^{Sa+Wn-t}(|L(i-t)-L(i)|\times i)}{\sum_{i=Sa}^{Sa+Wn-t}|L(i-t)-L(i)|}$$

wherein L ( ) is sensor data on the side of the standard portion 31c, Sa is minimum No. of the light-receiving elements on the side of the standard portion 31c, Wn is the number of light-receiving elements of a partial set, and t is an integer (generally 1 to 4).

In order to cancel the effects of noise, where the absolute value of the difference is less than a given value (noise cancel level), it is not added to the total sum.

In the present example, serial numbers are assigned to light-receiving elements arranged in a row, the elements being possessed by the line sensor 31c.

In this manner, a simple inclination angle detecting apparatus utilizing line type passive range finders used in cameras and so on can be accomplished.

Figure 12:
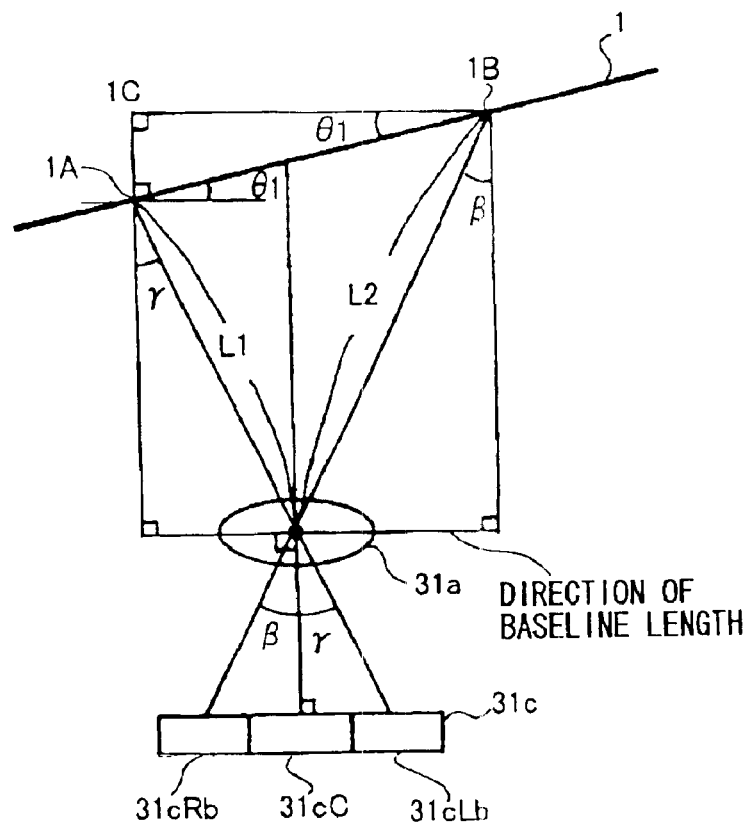
FIG. 12 is a diagram showing another inclination angle detection system of FIG. 1.

FIG. 12 is a diagram for illustrating another example of the aforementioned calculation of the inclination angle. This example includes detection of the inclination angle in the horizontal (left and right) direction, detection of the inclination angle in the vertical (up and down) direction, or detection of the inclination angle in a composite horizontal/vertical direction. Since an understanding can be made with a similar system, detection of the inclination angle in the horizontal direction using the line type passive range finder 3 is hereinafter described.

As shown in FIG. 12, let θ1 be the inclination angle of the screen 1 with respect to the baseline direction (horizontal direction of the projector 2) of the line type passive range finder 3. Let L1 be the result of range finding calculation using the range finding calculational region 31cLb. Let L2 be the result of range finding calculation using the range finding calculational region 31cRb. Let β be the angle between the range finding direction corresponding to the range finding calculational region 31cRb and a normal to the baseline length. Let γ be the angle between the range finding direction corresponding to the range finding calculational region 31cLb and a normal to the baseline length. The inclination angle θ1 can be found from $$\tan\theta 1 = (L2\cos\beta - L1\cos\gamma)/(L1\sin\gamma + L2\sin\beta)$$

Note that the angles β and γ are constants found at the stage of design. These values are previously stored in the control circuit 5.

Figure 13:
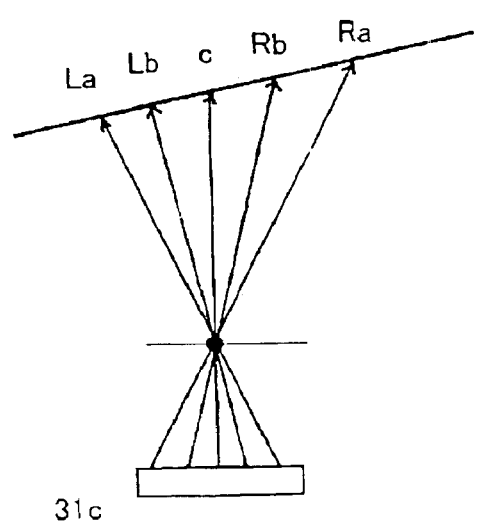
FIG. 13 is a diagram illustrating an operation for finding one inclination angle from a plurality of inclination angles.

The control circuit 5 finds plural inclination angles by the aforementioned method based on range finding results (hereinafter denoted "LLa, LLb, Lc, LRb, and LRa") about range finding directions La, Lb, c, Rb, and Ra shown in FIG. 13. In particular, one inclination angle θ1a is found from the LLa and LLb. One inclination angle θ1b is found from the LLb and Lc. One inclination angle θ1c is found from the Lc and LRb. One inclination angle θ1 is found from the LRb and LRa.

The inclination angle θ2 of the screen 1 with respect to the direction of the baseline (vertical direction of the projector 2) of the line type passive range finder 4 can be found on a principle similar to the foregoing.

Thus, the inclination angles θ1 and θ2 can be found by such calculations performed by the control circuit 5.

The control circuit 5 produces inclination angle information based on the found plural inclination angles in the vertical and horizontal directions to the display driving portion 7. The display driving portion 7 adjusts the projection optical system 8 including the condensing lens based on the horizontal and vertical inclination angles calculated by the control circuit 5 to thereby correct the keystone distortion in the projected image.

The inclination angle information based on the plural inclination angles can be any one of the found plural inclination angles. For example, when the found angles are arranged in order of decreasing angle, the inclination angle located in the center of the array may be used. The average value of the plural inclination angles may be used. The average value of the inclination angles left after removing the maximum and minimum angles may be used. In this way, by finding one inclination angle based on plural inclination angles, the effects can be reduced even if range finding is not done normally at least in one direction.

In addition, a plurality of directions may be classified into two groups, using the front direction as a reference. Based on range finding results of the range finding portion about the plural directions in one group, the inclination angle of the target to be measured with respect to the baseline (line in the direction of the baseline) is calculated. Also, based on range finding results of the range finding portion about the plural directions in the other group, the inclination angle of the target to be measured with respect to the reference line (line in the direction of the baseline) is calculated. One inclination angle may be found based on the two calculated inclination angles. In the case of the present embodiment, one inclination angle may be found from inclination angle $\theta1a$ and/or $\theta1b$. The other inclination angle may be found from inclination angle $\theta1c$ and/or $\theta1d$. One inclination angle may be found based on these two found inclination angles. The procedure of finding one inclination angle from a plurality of inclination angles almost conforms to the aforementioned contents. In this case, the overall inclination angle of the target to be measured can be found.

In the present embodiment, the projection optical system 8 including the condensing lens is adjusted based on the horizontal and vertical inclination angles calculated by the control circuit 5 to thereby optically correct the keystone distortion in the projected image. Alternatively, display data about an image with a keystone distortion opposite to the projected image may be created based on the horizontal and vertical inclination angles calculated by the control circuit 5 in the projected image creating portion 6. The keystone distortion in the projected image may be corrected electrically.

In this manner, distortion in the image corresponding to the relative inclination angle between the projector and the screen can be accomplished with a simple structure making use of line type passive range finders typically used in cameras and the like.

When the inclination angles $\theta1$ and $\theta2$ are found, the control circuit 5 stops the operation of the line type passive range finders 3 and 4 and ends the angle detection operation and the keystone distortion correcting operation.

After once finding the inclination angles $\theta1$ and $\theta2$, the control circuit 5 may operate the line passive range finders 3 and 4 again when a given time has passed to detect the inclination angles $\theta1$ and $\theta2$ again. A keystone distortion correcting operation may be again performed based on the detected inclination angles $\theta1$ and $\theta2$. Because of these operations, image distortion is corrected intermittently. Therefore, if the circumstance under which the screen or the projector is installed varies, distortion correction can be automatically performed according to the variation.

In the above instance, the inclination angle is detected about plural different directions using two line type passive range finders, and a keystone distortion is corrected based on the result of each detection. Alternatively, the inclination angle may be detected about one direction using a single line type passive range finder. A keystone distortion may be corrected based on the detected single inclination angle.

Furthermore, in the above instance, inclination angles in the vertical and horizontal directions are detected as plural different directions by two line type passive range finders. The plural different directions are not limited to the vertical and horizontal directions but rather may be modified appropriately.

In addition, in the above instance, the target to be measured is a screen. The measured target is not limited to a screen but rather may be modified appropriately.

Further, in the above instance, line type passive range finders are used as the range finding portion. The range finding portion is not limited to line type passive range finders. Active range finders or a range finding portion that sends out ultrasonic waves and measures a distance based on the time taken until the reflected waves are detected may also be used. Appropriate modifications are possible. Where line type passive range finders are used as a range finding portion, however, range finding in plural different directions is possible with one line type passive range finder. Consequently, the structure of the range finding portion can be miniaturized.

It is also noted that the present invention is not limited to the above embodiment. Rather, it may be implemented with appropriate modifications within a scope in which the gist is not changed.

According to the present invention, a range finding portion for finding the distance to a target to be measured in three or more, mutually different plural range finding directions and an inclination angle calculation portion for calculating two or more inclination angles of the target to be measured based on three or more range finding results of the range finding portion from a reference line and finding one inclination angle based on the calculated two or more inclination angles are included. Therefore, even where range finding is not done normally at least in one direction, the adverse effects can be reduced.

Where a line type passive range finder having a pair of lenses spaced from each other by a baseline length, line sensors on which a pair of images of a target to be measured are focused by the pair of lenses, and a calculating portion for calculating the distance in mutually different plural directions based on the outputs from the line sensors is used as a range finding portion, if a reference line is taken in the direction of the baseline length, the aforementioned advantages are produced. In addition, the distance to the measured target can be found in three or more mutually different plural range finding directions, using one line type passive range finder consequently, it is not necessary, for example, to increase the number of range finders according to an increase in the range finding directions as in the prior art. The angle detecting apparatus can be simplified in structure.

What is claimed is:

1. An angle detecting apparatus comprising: a range finding unit for determining a distance to an object in each of three or more mutually different directions; and an inclination angle calculating unit for calculating two or more inclination angles of the object relative to a reference line based on three or more range finding results obtained by the range finding unit and determining one inclination angle based on the two or more calculated inclination angles, to thereby reduce inaccuracy in the one inclination angle caused by an error in one of the two or more calculated inclination angles.

2. An angle detecting apparatus according to claim 1; wherein the range finding unit comprises a line type passive range finder having a pair of lenses spaced from each other by a baseline length, line sensors on which a pair of images of the object are focused by the pair of lenses, and a calculating unit for calculating the distance to the object based on outputs of the line sensors in each of a plurality of different directions; and wherein the reference line is in the direction of the baseline length.

3. An angle detecting apparatus according to claim 2; wherein the object is a viewing screen on which an image is projected and the one inclination angle comprises an inclination angle of the viewing screen relative to a projecting device which projects the image.

4. An angle detecting apparatus according to claim 1; wherein the inclination angle calculating unit calculates the average value of the two or more inclination angles to determine the one inclination angle.

5. An angle detecting apparatus according to claim 4; wherein the range finding unit comprises a line type passive range finder having a pair of lenses spaced from each other by a baseline length, line sensors on which a pair of images of the object are focused by the pair of lenses, and a calculating unit for calculating the distance to the object based on outputs of the line sensors in each of a plurality of different directions; and wherein the reference line is in the direction of the baseline length.

6. An angle detecting apparatus according to claim 1; wherein the three or more mutually different directions comprises at least four mutually different directions, and the inclination angle calculating unit calculates three or more inclination angles of the object relative to the reference line based on at least four range finding results obtained by the range finding unit and determines the one inclination angle based on inclination angles remaining after removing maximum and minimum angles from the three or more calculated inclination angles.

7. An angle detecting apparatus according to claim 6; wherein the range finding unit comprises a line type passive range finder having a pair of lenses spaced from each other by a baseline length, line sensors on which a pair of images of the object are focused by the pair of lenses, and a calculating unit for calculating the distance to the object based on outputs of the line sensors in each of a plurality of different directions; and wherein the reference line is in the direction of the baseline length.

8. An angle detecting apparatus according to claim 6; wherein the inclination angle calculating unit determines the average value of the remaining inclination angles as the one inclination angle.

9. An angle detecting apparatus according to claim 1; wherein the inclination angle calculating unit calculates a first inclination angle of the object relative to the reference line based on range finding results of the range finding unit for those of the three or more mutually different directions that are on one side of an axis extending from the angle detecting apparatus to the object, calculates a second inclination angle of the object relative to the reference line based on range finding results obtained by the range finding unit in those of the three or more mutually different directions that are on another side of the axis, and determines the one inclination angle based on the first and second calculated inclination angles.

10. An angle detecting apparatus according to claim 9; wherein the range finding unit comprises a line type passive range finder having a pair of lenses spaced from each other by a baseline length, line sensors on which a pair of images of the object are focused by the pair of lenses, and a calculating unit for calculating the distance to the object based on outputs of the line sensors in each of a plurality of different directions; and wherein the reference line is in the direction of the baseline length.

11. An angle detecting apparatus according to claim 1; wherein the object is a viewing screen or wall on which images are projected.

12. A projector for projecting an image generated according to an input image signal onto a viewing screen comprising: the inclination angle detecting apparatus according to claim 1; and an image distortion correcting unit for correcting distortion in the image projected onto the viewing screen based on an inclination angle calculated by the inclination angle detecting apparatus.

13. An angle detecting apparatus comprising: a line type passive range finder for determining a distance to an object in each of three or more mutually different directions and comprising a pair of lenses spaced from each other by a baseline length, line sensors on which a pair of images of the object are focused by the pair of lenses, and a calculating unit for calculating a distance to the object based on outputs of the line sensors in each of three or more mutually different directions; and an inclination angle calculating unit for calculating two or more inclination angles of the object relative to the baseline direction based on three or more range finding results of the line type passive range finder.

14. A projector for projecting an image generated according to an input image signal onto a viewing screen comprising: the inclination angle detecting apparatus according to claim 13; and an image distortion correcting unit for correcting distortion in the image projected onto the viewing screen based on an inclination angle calculated by the inclination angle detecting apparatus.

* * * * *